United States Patent
McIntyre, Jr. et al.

(10) Patent No.: US 6,479,097 B1
(45) Date of Patent: Nov. 12, 2002

(54) SOUND LINING FOR DUCTS

(76) Inventors: Robert J. McIntyre, Jr., 12736 Greensboro Rd., Greensboro, MD (US) 21639; Phylliss A. Benicewicz, 12736 Greensboro Rd., Greensboro, MD (US) 21639

(*) Notice: Subject to any disclaimer, the term of this patent is extended or adjusted under 35 U.S.C. 154(b) by 0 days.

(21) Appl. No.: 09/919,899

(22) Filed: Aug. 2, 2001

Related U.S. Application Data

(60) Provisional application No. 60/222,743, filed on Aug. 3, 2000.

(51) Int. Cl.$^7$ .................................................. B05D 7/22
(52) U.S. Cl. ........................ 427/236; 427/230; 427/421
(58) Field of Search .................................. 427/230, 236, 427/180, 181, 421; 181/212, 224; 138/145, 146; 454/906

(56) References Cited

U.S. PATENT DOCUMENTS 4,378,859 A * 4/1983 Satomi et al. .............. 181/224
4,615,411 A * 10/1986 Breitscheidel et al. ...... 181/224

* cited by examiner

*Primary Examiner*—Shrive P. Beck
*Assistant Examiner*—Rebecca A. Blanton
(74) *Attorney, Agent, or Firm*—Patent & Trademark Services; Joseph H. McGlynn

(57) ABSTRACT

A sound insulation lining for ducts. The duct is fabricated in a conventional manner and then a latex solution is sprayed on the interior surfaces. The sprayed layer is ⅛ inch thick and will take the place of conventional duct lining which is 1 to 2 inches thick.

6 Claims, No Drawings

SOUND LINING FOR DUCTS

Applicant claims the priority of Provisional application Ser. No. 60/222,743, filed Aug. 3, 2000.

BACKGROUND OF THE INVENTION

This invention relates, in general, to ducts, and, in particular, to sound linings for ducts.

Description of the Prior Art

In the prior art various types of sound insulated ducts have been proposed. For example, U.S. Pat. No. 4,410,065 to Harvey discloses a multi-layered acoustic lining for flow ducts.

U.S. Pat. No. 4,615,411 to Breitscheidel et al discloses a sound insulating flow duct with walls made up of an elastic thermoplastic closed cell foam.

U.S. Pat. No. 5,548,093 to Sato et al discloses a low noise hose with a sound adsorption mater made from a soft foam material.

U.S. Pat. No. 5,728,980 to Zarnick discloses a silencer for a duct which includes a plurality of acoustical flat panels mounted in a duct.

SUMMARY OF THE INVENTION

The present invention is directed to a sound insulation lining for ducts. The duct is fabricated in a conventional manner and then a latex solution is sprayed on the interior surfaces. The sprayed layer is ⅛ inch thick and will take the place of conventional duct lining which is 1 to 2 inches thick.

It is an object of the present invention to provide a new and improved sound proof lining for ducts.

It is an object of the present invention to provide a new and improved sound proof lining for ducts that is quicker and easier to apply.

It is an object of the present invention to provide a new and improved sound proof lining for ducts that is more economical in fabricating ducts.

These and other objects and advantages of the present invention will be fully apparent from the following description, when taken in connection with the annexed drawings.

DESCRIPTION OF THE PREFERRED EMBODIMENT

The present invention is designed to replace the conventional form of sound proofing ducts such as heating and cooling ducts. Presently sound proof ducts are fabricated by cutting flat sheet metal to shape, and notching the sheet metal to allow the metal to be bent into shape. An extra eight inches of metal are added to the dimensions of the duct to allow for the extra thickness of sound proofing (2 inches on each side) which will be placed on the interior walls of the duct.

The cut sheet metal is then placed on a table and the layers of sound lining is cut to shape. Adhesive is sprayed, or otherwise applied to what will become the inside surfaces of the duct when it is assembled. The sound lining is then pressed onto the surfaces with the adhesive and nosing or spray glue is applied to seal the ends of the ducts. Finally, the sheet metal is bent into the desired shape.

As can be discerned by the above steps, the fabrication of conventional sound proof ducts requires a number of steps which are time consuming, and therefore, expensive. In addition, the extra sheet metal, which is necessary to accommodate the thickness of the duct lining, requires extra sheet material, which again increases the cost of the ducts.

The present invention eliminates the extra sheet metal necessary with conventional methods of sound lining ducts. In addition, the extra steps used to construct a conventional duct with sound lining are reduced, thereby, saving time and again reducing the cost of the ducts.

The present invention comprising forming ducts in the same manner as a conventional non-sound proofed duct. Next the completely formed duct is moved to a spraying station, where the spray on coating of the present invention is sprayed onto the inside surfaces of the already formed duct.

The solution, which is sprayed onto the inside surfaces, is a binder comprising a latex solution into which is mixed a pine sawdust and a non-metallic mineral such as ceramic fibers. The pine sawdust and ceramic fibers are first washed in a disinfecting solution such as a Clorox solution before being mixed with the latex binder. The pine sawdust is intended to increase the thermal quality of the solution so that the solution will be able to withstand the temperature of the inside of heating ducts. In addition, the sawdust will make the ducts quieter so the sound of air moving in the ducts will not have as much of an impact on a person in the room through which the ducts run.

Although the Sound Lining for Ducts and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

We claim:

1. A method of applying sound lining to ducts, said method comprising:

preparing a mixture of sawdust and a non-metallic mineral, washing said mixture with a disinfecting solution, mixing said washed solution with a latex binder, applying said washed solution and latex binder to the inside of ducts.

2. The method as claimed in claim 1, wherein the sawdust is pine sawdust.

3. The method as claimed in claim 1, wherein the non-metallic mineral is ceramic.

4. The method as claimed in claim 1, wherein the disinfecting solution is BLEACH.

5. The method as claimed in claim 1, wherein the washed solution and latex binder are applied to the inside of ducts by spraying.

6. A method of applying sound lining to ducts, said method comprising:

preparing a mixture of pine sawdust and ceramic fibers, washing said mixture with a BLEACH solution, mixing said washed solution with a latex binder, spraying said washed solution and latex binder to the inside of ducts.

* * * * *